US008121132B2

(12) United States Patent
Binder

(10) Patent No.: US 8,121,132 B2
(45) Date of Patent: Feb. 21, 2012

(54) LOCAL AREA NETWORK FOR DISTRIBUTING DATA COMMUNICATION, SENSING AND CONTROL SIGNALS

(75) Inventor: Yehuda Binder, Hod Ha'sharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 1284 days.

(21) Appl. No.: 11/438,259

(22) Filed: May 23, 2006

(65) Prior Publication Data

US 2006/0209847 A1 Sep. 21, 2006

Related U.S. Application Data

(60) Division of application No. 11/190,884, filed on Jul. 28, 2005, now Pat. No. 7,200,152, which is a continuation of application No. 09/349,020, filed on Jul. 7, 1999, now Pat. No. 6,956,826.

(51) Int. Cl.
*H04L 12/56* (2006.01)
(52) U.S. Cl. .................... 370/400; 370/463; 370/254
(58) Field of Classification Search .................. 370/400, 370/463, 254, 258, 200, 293, 502, 222–224, 370/404–406, 424, 452–456, 460; 710/107; 379/413; 340/3.42–3.44
See application file for complete search history.

(56) References Cited

U.S. PATENT DOCUMENTS 3,370,125 A 2/1968 Shaw et al.
3,541,541 A * 11/1970 Engelbart ..................... 345/164

(Continued)

FOREIGN PATENT DOCUMENTS

EP 0355532 2/1990

(Continued)

OTHER PUBLICATIONS

Grayson Evans, The CEBUs Standard User's Guide, 1st edition, May 1996, 317 pages.

(Continued)

*Primary Examiner* — Edwin Holloway, III
(74) *Attorney, Agent, or Firm* — Browdy and Neimark, PLLC

(57) ABSTRACT

A network for carrying out control, sensing and data communications, comprising a plurality of nodes. Each node may be connected to a payload, which comprises sensors, actuators and DTE's. The network is formed using a plurality of independent communication links, each based on electrically-conducting communication media comprising at least two conductors and interconnecting two nodes, in a point-to-point configuration. During network operation, nodes can be dynamically configured as either data-generating nodes, wherein data is generated and transmitted into the network, or as receiver/repeater/router nodes, wherein received data is repeated from a receiver port to all output ports. During normal network operation, the network shifts from state to state. Each state is characterized by assigning a single node as the data-generating node, and configuring all other nodes in the network as repeaters and receivers. The network can be configured in linear or circular topology, or any mixture of both. The nodes and the payloads can each be powered by local power supply or via the network wiring. In the latter case, dedicated wires can be used, or the same conductors may be employed for both power distribution and communication. Network control can be performed external to the network, or by using the network itself as transport for control messages. Shifting from state to state can be done by selecting sequential nodes to be the data-generating node, or by selecting arbitrary nodes to be the data-generating node.

44 Claims, 8 Drawing Sheets

U.S. PATENT DOCUMENTS

| | | |
|---|---|---|
| 3,659,277 A | 4/1972 | Brown |
| 3,699,523 A | 10/1972 | Percher |
| 3,702,460 A | 11/1972 | Blose |
| 3,717,858 A | 2/1973 | Hadden |
| 3,943,283 A | 3/1976 | Caragliano et al. |
| 3,959,772 A | 5/1976 | Wakasa et al. |
| 4,012,734 A | 3/1977 | Jagoda et al. |
| 4,272,759 A | 6/1981 | Handy |
| 4,303,912 A * | 12/1981 | Stafford et al. ............... 345/603 |
| 4,303,993 A | 12/1981 | Panepinto, Jr. et al. |
| 4,339,750 A | 7/1982 | Delacruz |
| 4,367,557 A | 1/1983 | Stern et al. |
| 4,389,694 A | 6/1983 | Cornwell, Jr. |
| 4,463,341 A | 7/1984 | Iwasaki |
| 4,467,314 A | 8/1984 | Weikel et al. |
| 4,477,896 A | 10/1984 | Aker |
| 4,490,683 A | 12/1984 | Rhee |
| 4,495,617 A | 1/1985 | Ampulski et al. |
| 4,534,039 A | 8/1985 | Dodds et al. |
| 4,535,401 A | 8/1985 | Penn |
| 4,551,721 A | 11/1985 | Kozlik |
| 4,621,170 A | 11/1986 | Picandet |
| 4,633,217 A | 12/1986 | Akano |
| 4,639,714 A | 1/1987 | Crowe |
| 4,669,916 A | 6/1987 | White et al. |
| 4,719,616 A | 1/1988 | Akano |
| 4,733,389 A | 3/1988 | Puvogel |
| 4,734,919 A | 3/1988 | Tae |
| 4,736,367 A | 4/1988 | Wroblewski et al. |
| 4,761,646 A | 8/1988 | Choquet et al. |
| 4,780,714 A | 10/1988 | Moustakas et al. |
| 4,788,527 A | 11/1988 | Johansson |
| 4,799,211 A | 1/1989 | Felker et al. |
| 4,803,485 A | 2/1989 | Rypinski |
| 4,806,905 A | 2/1989 | McGowan, III et al. |
| 4,807,149 A | 2/1989 | Mehnert |
| 4,809,296 A | 2/1989 | Braun et al. |
| 4,809,339 A | 2/1989 | Shih et al. |
| 4,815,106 A | 3/1989 | Propp et al. |
| 4,866,757 A | 9/1989 | Nilssen |
| 4,890,102 A | 12/1989 | Oliver |
| 4,899,131 A | 2/1990 | Wilk et al. |
| 4,901,218 A | 2/1990 | Cornwell |
| 4,918,690 A | 4/1990 | Markula et al. |
| 4,926,158 A | 5/1990 | Zeigler |
| 4,937,811 A | 6/1990 | Harris |
| 4,953,055 A | 8/1990 | Douhet et al. |
| 4,955,018 A | 9/1990 | Twitty et al. |
| 4,979,183 A | 12/1990 | Cowart |
| 4,991,221 A | 2/1991 | Rush |
| 4,992,774 A | 2/1991 | McCullough |
| 5,001,774 A | 3/1991 | Lee |
| 5,003,457 A | 3/1991 | Ikei et al. |
| 5,021,779 A | 6/1991 | Bisak |
| 5,032,819 A | 7/1991 | Sakuragi et al. |
| 5,033,062 A | 7/1991 | Morrow et al. |
| 5,033,112 A | 7/1991 | Bowling et al. |
| 5,034,531 A | 7/1991 | Friary et al. |
| 5,034,882 A | 7/1991 | Eisenhard et al. |
| 5,063,563 A | 11/1991 | Ikeda et al. |
| 5,065,133 A | 11/1991 | Howard |
| 5,089,927 A | 2/1992 | Bulan et al. |
| 5,089,974 A | 2/1992 | Demeyer et al. |
| 5,095,417 A | 3/1992 | Hagiwara et al. |
| 5,121,482 A | 6/1992 | Patton |
| 5,124,990 A | 6/1992 | Williamson |
| 5,144,305 A | 9/1992 | Gotz et al. |
| 5,144,544 A | 9/1992 | Jenneve et al. |
| 5,146,471 A | 9/1992 | Cowart |
| 5,148,144 A | 9/1992 | Sutterlin et al. |
| 5,192,231 A | 3/1993 | Dolin, Jr. |
| 5,210,518 A | 5/1993 | Graham et al. |
| 5,210,519 A | 5/1993 | Moore |
| 5,241,283 A | 8/1993 | Sutterlin |
| 5,268,676 A | 12/1993 | Asprey et al. |
| 5,274,631 A | 12/1993 | Bhardwaj |
| 5,285,477 A | 2/1994 | Leonowich |
| 5,289,476 A | 2/1994 | Johnson et al. |
| 5,311,518 A | 5/1994 | Takato et al. |
| 5,319,571 A | 6/1994 | Langer et al. |
| 5,347,549 A | 9/1994 | Baumann et al. |
| 5,353,409 A | 10/1994 | Asprey et al. |
| 5,355,114 A | 10/1994 | Sutterlin et al. |
| 5,368,041 A | 11/1994 | Shambroom |
| 5,375,051 A | 12/1994 | Decker et al. |
| 5,381,804 A | 1/1995 | Shambroom |
| 5,391,932 A | 2/1995 | Small et al. |
| 5,396,636 A | 3/1995 | Gallagher et al. |
| 5,406,260 A | 4/1995 | Cummings et al. |
| 5,410,535 A | 4/1995 | Yang et al. |
| 5,414,708 A | 5/1995 | Webber et al. |
| 5,422,519 A | 6/1995 | Russell |
| 5,438,678 A | 8/1995 | Smith |
| 5,450,393 A | 9/1995 | Watanabe et al. |
| 5,451,923 A | 9/1995 | Seberger et al. |
| 5,457,629 A | 10/1995 | Miller et al. |
| 5,469,150 A | 11/1995 | Sitte |
| 5,477,091 A | 12/1995 | Fiorina et al. |
| 5,483,230 A | 1/1996 | Mueller |
| 5,483,656 A | 1/1996 | Oprescu et al. |
| 5,491,402 A | 2/1996 | Small |
| 5,517,172 A | 5/1996 | Chiu |
| 5,525,962 A | 6/1996 | Tice |
| 5,528,089 A | 6/1996 | Guiset et al. |
| 5,530,748 A | 6/1996 | Ohmori |
| 5,535,336 A | 7/1996 | Smith et al. |
| 5,546,385 A | 8/1996 | Caspi et al. |
| 5,563,515 A | 10/1996 | Kako |
| 5,572,182 A | 11/1996 | De Pinho Filho et al. |
| 5,579,486 A | 11/1996 | Oprescu et al. |
| 5,581,710 A * | 12/1996 | Noel et al. ............... 370/276 |
| 5,581,801 A | 12/1996 | Spriester et al. |
| 5,610,552 A | 3/1997 | Schlesinger et al. |
| 5,613,130 A | 3/1997 | Teng et al. |
| 5,635,896 A | 6/1997 | Tinsley et al. |
| 5,644,286 A | 7/1997 | Brosh et al. |
| 5,649,111 A * | 7/1997 | Rehquate et al. ............. 709/249 |
| 5,652,893 A | 7/1997 | Ben-Meir et al. |
| 5,675,813 A | 10/1997 | Holmdahl |
| 5,680,397 A | 10/1997 | Christensen et al. |
| 5,680,405 A | 10/1997 | Pesetski et al. |
| 5,684,826 A | 11/1997 | Ratner |
| 5,689,230 A | 11/1997 | Merwin et al. |
| 5,706,278 A | 1/1998 | Robillard et al. |
| 5,727,025 A | 3/1998 | Maryanka |
| 5,748,634 A | 5/1998 | Sokol et al. |
| 5,754,539 A | 5/1998 | Metz et al. |
| 5,774,789 A | 6/1998 | van der Kaay et al. |
| 5,777,769 A | 7/1998 | Coutinho |
| 5,778,303 A | 7/1998 | Shinozaki et al. |
| 5,781,844 A | 7/1998 | Spriester et al. |
| 5,796,965 A | 8/1998 | Choi et al. |
| 5,799,196 A | 8/1998 | Flannery |
| 5,805,591 A | 9/1998 | Naboulsi et al. |
| 5,805,597 A | 9/1998 | Edem |
| 5,815,681 A | 9/1998 | Kikinis |
| 5,828,293 A | 10/1998 | Rickard |
| 5,828,558 A | 10/1998 | Korcharz et al. |
| 5,838,989 A | 11/1998 | Hutchison et al. |
| 5,841,360 A | 11/1998 | Binder |
| 5,848,376 A | 12/1998 | Steiner et al. |
| 5,859,584 A | 1/1999 | Counsell et al. |
| 5,859,596 A | 1/1999 | McRae |
| 5,875,210 A | 2/1999 | Brief et al. |
| 5,884,086 A * | 3/1999 | Amoni et al. ............... 713/300 |
| 5,892,795 A | 4/1999 | Paret |
| 5,909,559 A | 6/1999 | So |
| 5,914,957 A * | 6/1999 | Dean et al. ............... 370/438 |
| 5,939,801 A | 8/1999 | Bouffard et al. |
| 5,944,831 A | 8/1999 | Pate et al. |
| 5,946,321 A | 8/1999 | Dean |
| 5,960,208 A | 9/1999 | Obata et al. |
| 5,973,942 A | 10/1999 | Nelson et al. |
| 5,974,553 A | 10/1999 | Gandar |
| 5,982,052 A | 11/1999 | Sosnowski |
| 5,990,577 A | 11/1999 | Kamioka et al. |
| 5,991,885 A | 11/1999 | Chang et al. |

| | | |
|---|---|---|
| 5,994,998 A | 11/1999 | Fisher et al. |
| 6,016,519 A | 1/2000 | Chida et al. |
| 6,025,945 A | 2/2000 | Nyu et al. |
| 6,033,101 A | 3/2000 | Reddick et al. |
| 6,038,457 A | 3/2000 | Barkat |
| 6,049,471 A | 4/2000 | Korcharz et al. |
| 6,049,881 A | 4/2000 | Massman et al. |
| 6,055,633 A | 4/2000 | Schrier et al. |
| 6,075,438 A | 6/2000 | Abe et al. |
| 6,087,835 A | 7/2000 | Haneda |
| 6,095,867 A | 8/2000 | Brandt et al. |
| 6,097,761 A | 8/2000 | Buhring et al. |
| 6,101,499 A * | 8/2000 | Ford et al. ................. 707/10 |
| 6,114,632 A | 9/2000 | Planas, Sr. et al. |
| 6,115,468 A | 9/2000 | De Nicoto |
| 6,115,755 A | 9/2000 | Krishan |
| 6,115,822 A | 9/2000 | Kim et al. |
| 6,125,448 A | 9/2000 | Schwan et al. |
| 6,126,463 A | 10/2000 | Okazaki et al. |
| 6,128,743 A | 10/2000 | Rothenbaum |
| 6,141,763 A | 10/2000 | Smith et al. |
| 6,166,496 A | 12/2000 | Lys et al. |
| 6,175,556 B1 | 1/2001 | Allen, Jr. et al. |
| 6,178,514 B1 | 1/2001 | Wood |
| 6,188,314 B1 | 2/2001 | Wallace et al. |
| 6,218,930 B1 | 4/2001 | Katzenberg et al. |
| 6,243,818 B1 | 6/2001 | Schwan et al. |
| 6,246,748 B1 | 6/2001 | Yano |
| 6,283,789 B1 | 9/2001 | Tsai |
| 6,301,527 B1 | 10/2001 | Butland et al. |
| 6,308,215 B1 | 10/2001 | Kolbet et al. |
| 6,308,240 B1 | 10/2001 | De Nicolo |
| 6,310,286 B1 | 10/2001 | Troxel et al. |
| 6,310,781 B1 | 10/2001 | Karam |
| 6,317,839 B1 | 11/2001 | Wells |
| 6,320,494 B1 | 11/2001 | Bartels et al. |
| 6,343,331 B1 | 1/2002 | Stirling |
| 6,348,874 B1 | 2/2002 | Cole et al. |
| 6,357,011 B2 | 3/2002 | Gilbert |
| 6,362,610 B1 | 3/2002 | Yang |
| 6,363,066 B1 | 3/2002 | Frimodig |
| 6,366,143 B1 | 4/2002 | Liu et al. |
| 6,377,874 B1 | 4/2002 | Ykema |
| 6,385,024 B1 | 5/2002 | Olson |
| 6,389,139 B1 | 5/2002 | Curtis et al. |
| 6,393,607 B1 | 5/2002 | Hughes et al. |
| 6,396,391 B1 | 5/2002 | Binder |
| 6,448,899 B1 | 9/2002 | Thompson |
| 6,449,348 B1 | 9/2002 | Lamb et al. |
| 6,459,175 B1 | 10/2002 | Potega |
| 6,459,275 B1 | 10/2002 | Ewalt et al. |
| 6,470,401 B1 | 10/2002 | Peterson |
| 6,473,608 B1 | 10/2002 | Lehr et al. |
| 6,477,457 B1 | 11/2002 | Fendt et al. |
| 6,480,122 B1 | 11/2002 | Oddy et al. |
| 6,480,510 B1 | 11/2002 | Binder |
| 6,496,103 B1 | 12/2002 | Weiss et al. |
| 6,501,389 B1 | 12/2002 | Aguirre |
| 6,522,515 B1 | 2/2003 | Whitney |
| 6,526,516 B1 | 2/2003 | Ishikawa et al. |
| 6,529,443 B2 | 3/2003 | Downey, Jr. et al. |
| 6,535,983 B1 | 3/2003 | McCormack et al. |
| 6,539,484 B1 | 3/2003 | Cruz |
| 6,541,878 B1 | 4/2003 | Diab |
| 6,546,494 B1 | 4/2003 | Jackson et al. |
| 6,553,076 B1 | 4/2003 | Huang |
| 6,556,097 B2 | 4/2003 | Coffey |
| 6,556,564 B2 | 4/2003 | Rogers |
| 6,563,418 B1 | 5/2003 | Moon |
| 6,571,181 B1 | 5/2003 | Rakshani et al. |
| 6,571,305 B1 | 5/2003 | Engler |
| 6,574,741 B1 | 6/2003 | Fujimori et al. |
| 6,577,230 B1 | 6/2003 | Wendt et al. |
| 6,584,519 B1 | 6/2003 | Russell |
| 6,587,454 B1 | 7/2003 | Lamb |
| 6,603,220 B2 | 8/2003 | Vergnaud |
| 6,608,264 B1 | 8/2003 | Fouladpour |
| 6,611,537 B1 | 8/2003 | Edens et al. |
| 6,640,308 B1 | 10/2003 | Keyghobad et al. |
| 6,643,566 B1 | 11/2003 | Lehr et al. |
| 6,648,308 B1 | 11/2003 | Gunnar Rothoff |
| 6,650,622 B1 | 11/2003 | Austerman, III et al. |
| 6,654,353 B1 * | 11/2003 | Tokura et al. ................. 370/254 |
| 6,658,109 B1 | 12/2003 | Steinke et al. |
| 6,659,947 B1 | 12/2003 | Carter et al. |
| 6,661,892 B1 | 12/2003 | Fischer |
| 6,671,360 B2 | 12/2003 | Sumiya et al. |
| 6,681,013 B1 | 1/2004 | Miyamoto |
| 6,701,443 B1 | 3/2004 | Bell |
| 6,715,087 B1 | 3/2004 | Vergnaud et al. |
| 6,738,641 B1 | 5/2004 | Elsasser |
| 6,751,682 B1 | 6/2004 | Stirling |
| 6,755,575 B2 | 6/2004 | Kronlund et al. |
| 6,762,675 B1 | 7/2004 | Cafiero et al. |
| 6,764,343 B2 | 7/2004 | Ferentz |
| 6,800,957 B2 | 10/2004 | Nerone et al. |
| 6,804,351 B1 | 10/2004 | Karam |
| 6,804,828 B1 | 10/2004 | Shibata |
| 6,825,672 B1 | 11/2004 | Lo et al. |
| 6,831,921 B2 | 12/2004 | Higgins |
| 6,841,979 B2 | 1/2005 | Berson et al. |
| 6,870,282 B1 | 3/2005 | Bischoff et al. |
| 6,880,020 B1 | 4/2005 | Rubinstein et al. |
| 6,889,095 B1 | 5/2005 | Eidson et al. |
| 6,906,618 B2 | 6/2005 | Hair, III et al. |
| 6,912,145 B2 | 6/2005 | Hung et al. |
| 6,912,282 B2 | 6/2005 | Karam |
| 6,947,287 B1 | 9/2005 | Zansky et al. |
| 6,952,785 B1 | 10/2005 | Diab et al. |
| 6,954,863 B2 | 10/2005 | Mouton |
| 6,956,462 B2 | 10/2005 | Jetzt |
| 6,956,463 B2 | 10/2005 | Crenella et al. |
| 6,961,303 B1 | 11/2005 | Binder |
| 6,963,936 B2 | 11/2005 | Billington et al. |
| 6,973,394 B2 | 12/2005 | Jaeger et al. |
| 6,975,209 B2 | 12/2005 | Gromov |
| 6,977,507 B1 | 12/2005 | Pannell et al. |
| 6,985,713 B2 | 1/2006 | Lehr et al. |
| 6,986,071 B2 | 1/2006 | Darshan et al. |
| 6,995,658 B2 | 2/2006 | Tustison et al. |
| 6,996,458 B2 | 2/2006 | Pincu et al. |
| 7,010,050 B2 | 3/2006 | Maryanka |
| 7,023,809 B1 | 4/2006 | Rubinstein et al. |
| 7,026,730 B1 | 4/2006 | Marshall et al. |
| 7,030,733 B2 | 4/2006 | Abbarin |
| 7,046,983 B2 | 5/2006 | Elkayam et al. |
| 7,049,514 B2 | 5/2006 | Brandt et al. |
| 7,053,501 B1 | 5/2006 | Barrass |
| 7,061,142 B1 | 6/2006 | Marshall |
| 7,068,781 B2 | 6/2006 | Le Creff et al. |
| 7,072,995 B1 | 7/2006 | Burroughs |
| 7,079,647 B2 | 7/2006 | Tomobe |
| 7,081,827 B2 | 7/2006 | Addy |
| 7,089,126 B2 | 8/2006 | Muir |
| 7,117,272 B2 | 10/2006 | Rimboim et al. |
| 7,143,299 B1 | 11/2006 | Rubinstein et al. |
| 7,145,439 B2 | 12/2006 | Darshan et al. |
| 7,152,168 B2 | 12/2006 | Boynton et al. |
| 7,154,381 B2 | 12/2006 | Lang et al. |
| 7,155,214 B2 | 12/2006 | Struthers et al. |
| 7,155,622 B2 | 12/2006 | Mancey et al. |
| 7,162,234 B1 | 1/2007 | Smith |
| 7,162,377 B2 | 1/2007 | Amrod et al. |
| 7,162,650 B2 | 1/2007 | Ke et al. |
| 7,170,194 B2 | 1/2007 | Korcharz et al. |
| 7,170,405 B2 | 1/2007 | Daum et al. |
| 7,181,023 B1 | 2/2007 | Andrews et al. |
| 7,193,149 B2 | 3/2007 | Polanek et al. |
| 7,194,639 B2 | 3/2007 | Atkinson et al. |
| 7,200,152 B2 | 4/2007 | Binder |
| 7,203,849 B2 | 4/2007 | Dove |
| 7,203,851 B1 | 4/2007 | Lo et al. |
| 7,207,846 B2 | 4/2007 | Caveney et al. |
| 7,221,261 B1 | 5/2007 | Klingensmith et al. |
| 7,225,345 B2 | 5/2007 | Korcharz et al. |
| 7,231,535 B2 | 6/2007 | Le Creff et al. |
| 7,240,224 B1 | 7/2007 | Biederman |
| 7,254,734 B2 | 8/2007 | Lehr et al. |

| | | |
|---|---|---|
| 7,256,684 B1 | 8/2007 | Cafiero et al. |
| 7,257,108 B2 | 8/2007 | Cheston et al. |
| 7,272,669 B2 | 9/2007 | Mattur et al. |
| 7,280,032 B2 | 10/2007 | Aekins et al. |
| 7,281,141 B2 | 10/2007 | Elkayam et al. |
| 7,299,287 B1 | 11/2007 | Rubinstein et al. |
| 7,299,368 B2 | 11/2007 | Peker et al. |
| 7,310,355 B1 | 12/2007 | Krein et al. |
| 7,316,586 B2 | 1/2008 | Anderson et al. |
| 7,324,824 B2 | 1/2008 | Smith et al. |
| 7,330,695 B2 | 2/2008 | Karschnia et al. |
| 7,331,819 B2 | 2/2008 | Nelson et al. |
| 7,343,506 B1 | 3/2008 | Fenwick |
| 7,353,407 B2 | 4/2008 | Diab et al. |
| 7,356,588 B2 | 4/2008 | Stineman, Jr. et al. |
| 7,363,525 B2 | 4/2008 | Biederman et al. |
| 7,368,798 B2 | 5/2008 | Camagna et al. |
| 7,373,528 B2 | 5/2008 | Schindler |
| 7,376,734 B2 | 5/2008 | Caveney |
| 7,380,044 B1 | 5/2008 | Liburdi |
| 7,404,091 B1 | 7/2008 | Gere |
| 7,404,094 B2 | 7/2008 | Lee et al. |
| 7,406,614 B2 | 7/2008 | Peleg et al. |
| 2001/0038635 A1 | 11/2001 | Rogers |
| 2002/0063584 A1 | 5/2002 | Molenda et al. |
| 2002/0144159 A1 | 10/2002 | Wu et al. |
| 2002/0188762 A1 | 12/2002 | Tomassetti et al. |
| 2003/0035556 A1 | 2/2003 | Curtis et al. |
| 2003/0061522 A1 | 3/2003 | Ke et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2004/0073597 A1 | 4/2004 | Caveney et al. |
| 2004/0090984 A1 | 5/2004 | Saint-Hilaire et al. |
| 2004/0136373 A1 | 7/2004 | Bareis |
| 2004/0136388 A1 | 7/2004 | Schaff |
| 2004/0146061 A1 | 7/2004 | Bisceglia et al. |
| 2004/0164619 A1 | 8/2004 | Parker et al. |
| 2004/0180573 A1 | 9/2004 | Chen |
| 2004/0230846 A1 | 11/2004 | Mancey et al. |
| 2004/0232768 A1 | 11/2004 | Hung et al. |
| 2004/0236967 A1 | 11/2004 | Korcharz et al. |
| 2004/0268160 A1 | 12/2004 | Atkinson et al. |
| 2005/0053087 A1 | 3/2005 | Pulyk |
| 2005/0063108 A1 | 3/2005 | Voll et al. |
| 2005/0078700 A1 | 4/2005 | Thompson et al. |
| 2005/0097369 A1 | 5/2005 | Bowser et al. |
| 2005/0125507 A1 | 6/2005 | Atias et al. |
| 2005/0136972 A1 | 6/2005 | Smith et al. |
| 2005/0136989 A1 | 6/2005 | Dove |
| 2005/0152306 A1 | 7/2005 | Bonnassieux et al. |
| 2005/0152323 A1 | 7/2005 | Bonnassieux et al. |
| 2005/0201306 A1 | 9/2005 | Engel |
| 2005/0245127 A1 | 11/2005 | Nordin et al. |
| 2005/0268120 A1 | 12/2005 | Schindler et al. |
| 2005/0281326 A1 | 12/2005 | Yu |
| 2006/0053324 A1 | 3/2006 | Giat et al. |
| 2006/0089230 A1 | 4/2006 | Biederman et al. |
| 2006/0165097 A1 | 7/2006 | Caveney |
| 2006/0168459 A1 | 7/2006 | Dwelley et al. |
| 2006/0181398 A1 | 8/2006 | Martich et al. |
| 2006/0197387 A1 | 9/2006 | Hung et al. |
| 2006/0215680 A1 | 9/2006 | Camagna |
| 2006/0238250 A1 | 10/2006 | Camagna et al. |
| 2006/0251179 A1 | 11/2006 | Ghoshal |
| 2006/0262727 A1 | 11/2006 | Caveney |
| 2006/0269001 A1 | 11/2006 | Dawson et al. |
| 2007/0041577 A1 | 2/2007 | Ghoshal et al. |
| 2007/0058666 A1 | 3/2007 | Pratt |
| 2007/0083668 A1 | 4/2007 | Kelsey et al. |
| 2007/0198748 A1 | 8/2007 | Ametsitsi et al. |
| 2007/0206749 A1 | 9/2007 | Pincu et al. |
| 2007/0208961 A1 | 9/2007 | Ghoshal et al. |
| 2007/0220618 A1 | 9/2007 | Holmes et al. |
| 2007/0236853 A1 | 10/2007 | Crawley |
| 2007/0254714 A1 | 11/2007 | Martich et al. |
| 2007/0260904 A1 | 11/2007 | Camagna et al. |
| 2008/0058018 A1 | 3/2008 | Scheinert |
| 2008/0140565 A1 | 6/2008 | DeBenedetti et al. |

FOREIGN PATENT DOCUMENTS

| | | |
|---|---|---|
| WO | 9623377 A1 | 8/1996 |
| WO | WO 96/23377 | 8/1996 |
| WO | WO 96 37984 | 11/1996 |
| WO | WO 99/53627 | 10/1999 |

OTHER PUBLICATIONS

Mark Hachman, Compaq to Ride the CEBus, EBN, Jan. 22, 1996, 1 page.

Home Automation Buses: Protocols Really Hit Home, EDN, Apr. 13, 1995, 9 pages.

Brian E. Markwalter, et al; CEBus Router Testing, IEEE Transactions on Consumer Electronics, Nov. 1991, vol. 37, No. 4, 8 pages.

Draft IS-60.04 Node Communications Protocol Part 6: Application Layer Specification, Rev. Apr. 18, 1996, 129 pages.

Lon Works LPI-10 Link Power interface Module User's Guide; Echelon Corporation, 1995 (37 pages).

Lon Works LPT-10 Link Power Transceiver User's Guide Version 2.1; Echelon Corporation, 1995 (60 pages).

Lon Works Router User's Guide Revision 3; Echelon Corporation, 1995 (68 pages).

Using the Lon Works PLT-22 Power Line Transceiver in European Utility Application, Version 1; Echelon Corporation, 1996-1999 (118 pages).

PL3120/PL3150 Power Line Smart Transceiver Data Book, Version 2; Echelon Corporation, 1996-2005 (255 pages).

PL DSK 2.1 Power Line Smart Transceiver Development Support Kit User's Guide; Echelon Corporation, 2005-2006 (18 pages).

Introduction to Pyxos FT Platform; Echelon Corporation, 2007 (34 pages).

LTM-10A User's Guide, Revision 4; Echelon Corporation, 1995-2001 (46 pages).

Lon Works Twisted Pair Control Module, User's Guide Version 2; Echelon Corporation, 1992-1996 (50 pages).

AN1000EVK Evaluation Unit Manual, Draft 1.0; Adaptive Networks Inc., Aug. 1996 (31 pages).

AN1000 Powerline Network Communications Chip Set, Adaptive Networks Inc., 1995 (56 pages).

From the Ether—Bob Metcalfe, 'Cheap, reliable 'net connections may be as close as an electrical socket'; by Bob Metcalfe Info World Feb. 10, 1997 vol. 19 Issue 6 (4 pages).

Lon Works Custom Node Development, Lon Works Engineering Bulletin; Echelon Corporation, Jan. 1995 (16 pages).

Building a Lon Talk-to-PLC Gateway, Lon Works Engineering Bulletin; Echelon Corporation, May 1994 (62 pages).

Lon Works 78kbps Self-Healing Ring Architecture, Lon Works Marketing Bulletin; Echelon Corporation, Aug. 1993 (6 pages).

Centralized Commercial Building Applications with the Lon Works PLT-21 Power Line Transceiver, Lon Works Engineering Bulletin; Echelon Corporation, Apr. 1997 (22 pages).

Lon Works for Audio Computer Control Network Applications; Echelon Corporation, Jan. 1995 (30 pages).

Demand Side Management with Lon Works Power Line Transceivers, Lon Works Engineering Bulletin; Echelon Corporation, Dec. 1996 (36 pages).

'Switching Hubs—Switching to the Fast Track', by Gary Gunnerson, PC Magazine, Oct. 11, 1994 (24 pages).

VISPLAN-10 Infrared Wireless Lan system; JVC May 1996 (10 pages).

'JVC Introduces Ethernet Compatible Wireless LAN System'; Business Wire Sep. 26, 1995 (1 page).

Ethernet Wireless LAN Systems; BYTE Feb. 1996 (3 pages).

'JVC Introduces First Ethernet Compatible Wireless LAN System'; Business Wire Nov. 8, 1995 (1 page).

Intelogis to Present on Stage at Internet Showcase 1998; PR Newswire Jan. 28, 1998 (1 page).

PassPort PC Plug in Quick Setup Guide; Intelogis P/N 30030202, date unknown (8 pages).

High Speed Networking with LAN Switches, by Gilbert Held; Copyright 1997 by John Wiley & Sons, Inc. (290 pages).

'The Complete Modem Reference', Third Edition, By Gilbert Held, 1997, ISBN: 0-471-15457-1 (488 pages).

'High-Speed Networking with LAN Switches', By Gilbert Held, 1997, ISBN: 0-471-18444-6 (281 pages).

'Interconnections Bridges and Routers', By Radia Perlman, 1992, ISBN: 0-201-56332-0 (393 pages).

'Macworld Networking Bible', Second Edition pp. 1-331, By Dave Kosiur and Joel M. Snyder, 1994, ISBN: 1-56884-194-9 (354 pages).

'Macworld Networking Bible', Second Edition pp. 332-688, By Dave Kosiur and Joel M. Snyder, 1994, ISBN: 1-56884-194-9 (363 pages).

Gershon, E.; "FDDI on Copper with AMD PHY Components"; Advanced Micro Devices, Inc.; 1991, pp. 1-7.

Lavoisard, J.L. et al; "ISDN Customer Equipments"; Commutation and Transmission, No. 3, 1987, pp. 35-50.

Keller et al; "Performance Bottlenecks in Digital Movie Systems"; Proceedings of the 4$^{th}$ International Workshop on Network and Operating System Support for Digital Audio and Video, 1993, pp. 161-172.

Stallings, W.; "Local Networks—An Introduction" pp. ii,xii-xvi, 373-381, 1984.

Stallings, W.; "Local Networks—Second Edition" pp. I-v, viii-xiv, 427-434, 1987.

Stallings, W.; "Local Networks—Third Edition" pp. I-v, x--xvi, 499-510, 1990.

Strole, N.; "The IBM Token-Ring Network—A functional Overview"; ; IEEE Network Magazine, vol. 1, No. 1, 1987, pp. 23-30.

Willett, M.; "Token-ring Local Area Networks—An Introduction"; IEEE Network Magazine, vol. 1, No. 1, 1987, pp. 8 and 9.

"Integrated Services Digital Network (ISDN)", International Telecommunications Union, vol. III, Fascicle III.8, pp. 175-176 and 204-209, 1988.

An Interoperable Solution for FDDI Signaling Over Shielded Twisted Pair; Advanced Micro Devices, Inc.; May 1991, pp. 1-16.

SuperStack II Baseline Switch User Guide; 3Com; 1996 pp. 1-8.

SuperStack II Entry Hub User Guide; 3Com; 1996 pp. 1-8.

SuperStack II Baseline Switch 610 User Guide; 3Com; 1999, pp. 1-48.

SuperStack II Baseline 10/100 Switch User Guide; 3Com; 1998, pp. 1-8.

Cisco Catalyst 5000 Switching System; http://web/19961220170336/www.cisco.com; pp. 1-4, 1996.

Cisco Catalyst 5000 Series Documentation; http://web.archive.org/web/19961220192608/www.cisco.com; pp. 1-11, 1996.

Cisco Catalyst 5000 Group Switching Ethernet Modules; http://web.archive.org/web/19961220192604/www.cisco.com; pp. 1-5, 1996.

Cisco Catalyst 5000: Industry's First Modular, Multilayer-Capable Switching System for the Wiring Closet; http://web.archive.org/web/19961220192714/www.cisco.com; pp. 1-22, 1996.

Cisco Catalyst 5000 ATM Dual PHY LAN Emulation Module; http://web.archive.org/web/19961220191454/www.cisco.com; pp. 1-4, 1996.

Cisco LAN Emulation; http://web.archive.org/web/19961220192930/www.cisco.com; pp. 1-16, 1996.

Cisco Fast Ethernet 100-Mbps Solutions; http://web.archive.org/web/19961220192938/www.cisco.com; pp. 1-10, 1996.

Cisco Catalyst 5000: Industry's First Modular, Multilayer-Capable Switching System for the Wiring Closet; Cisco Systems, 1996, pp. 1-22.

Network Based Exchange—The Complete Communications Solution, NBX Corporation, 1997; 16 pages.

The Mac Reborn; Macworld, vol. 13, Issue 9, Sep. 1996, pp. 1-10.

SuperStack II Desktop Switch; 3Com, 1996, 2 pages.

CiscoPro Ether Switch CPW2115; Cisco Systems; 1995, 4 pages.

Hart Field Communication Protocol—an introduction for users and manufacturers; Hart Communication Foundation, 1995, 12 pages.

3ComImpactIQ External ISDN Modem; 3COM, 1996, 4 pages.

The Macintosh Reborn, Macworld—The Essential Macintosh Resource; 1996, 16 pages.

Cisco 2610 Router Cabling and Setup—Quick Start Guide; Cisco Systems, 1998, 18 pages.

Network Based Exchange—The Complete Communication Solution; NBX Corporation, 1997, 16 pages.

-48-Volt DC Power Supply Connection Guide, For the SuperStack II Switch 3900; Mar. 2000, pp. 1-9.

SuperStack II PS Hub User Guide; 3com; Jul. 1997; 188 pages.

SuperStack II Desktop Switch User Guide; 3Com; Jun. 1997; 148 pages.

Universal Serial Bus Specification Revision 1.0: Jan. 1996; 268 pages.

ComImpact IQ External ISDN Modem User Guide; Jul. 1997; 158 pages.

IEEE Standard for a High Performance Serial Bus; IEEE Std. 1394-1995; 1996; 392 pages.

Donnan, et al; "Token Ring Access Method and Physical Layer Specifications"; ANSI/IEEE Standard for Local Area Networks; ANSI/IEEE 802.5; 80 pages, 1985.

Gibson et al; Fibre Data Distributed Interface (FDDI)—Token Ring Physical Layer Medium Dependent (PMD); American National Standard for Information Systems; ANSI X3.166-1990; 58 pages, 1990.

Gibson et al; Fiber Distributed Data Interface (FDDI)—Token Ring Physical Layer Protocol (PHY); American National Standard for Information Systems; ANSI X3.148-1988; 34 pages, 1988.

Lohse, et al; Fiber Distributed Data Interface (FDDI)—Token Ring Media Access Control (MAC); American National Standard for Information Systems; ANSI X3.139-1987; 62 pages; 1987.

Stallings, W., Local Networks, an Introduction, p. 1-97, 1984.

Claim Chart presented in request for reexamination of U.S. Patent No. 6,480,510 request filed Jun. 10, 2009.

Claim Chart presented in request for reexamination of U.S. Patent No. 5,841,360 request filed May 26, 2009.

Universal Serial Bus Specification—Rev. 1.0, Jan. 15, 1996; Sec. 4.2.1 pp. 29-30.

Universal Serial Bus Specification—Rev. 1.0, Jan. 15, 1996; Sec. 7.2.1-7.2.1.5 pp. 131-135.

Universal Serial Bus Specification—Rev. 1.0, Jan. 15, 1996; Sec. 9.2.1-9.2.5.1 pp. 170-171.

Universal Serial Bus Specification—Rev. 1.0, Jan. 15, 1996; Sec. 9.6.2 pp. 184-185.

Bearfield, J.M., "Control the Power Interface of USB's Voltage Bus", Electronic Design, U.S., Penton Publishing, Clev. Ohio, vol. 45, No. 15, Jul. 1997, p. 80-86.

RAD Data Comm. Ltd., "Token Ring Design Guide", 1994, #TR-20-01/94, Chapters 1 through 4-21.

PowerDsine Product Catalogue 1999, pp. 56-79 and 95-105, Israel.

ITU-T 1.430 Integrated Services Digital Network—Basic User-Network Interface—Layer 1 Specification, Nov. 1995.

J. Hofmann, Cable, Television, and the Consumer Electronic Bus, Symposium Record, 15th International TV Symposium, Jun. 11, 1987, Montreux, Switzerland, 9 pages.

Cisco Catalyst 5002 Switching System Data sheet; Cisco Systems, 1999, 4 pages.

Cisco Catalyst 5000 Series; Cisco Systems, 1996, pp. 589-600.

Cisco Catalyst 5000 Group Switching Ethernet Modules Data Sheet; Cisco Systems, 1996, 9 pages.

3Com NBX 2101PE Basic Phone Product Details; http://www.3com.com/products/enUS/printsafe.jsp?sku=3C10248PE&pathtype=support; Jan. 8, 2007, pp. 1-3.

* cited by examiner

| Node State | SW1 | SW2 | SW3 | SW4 |
|---|---|---|---|---|
| Right-to-left | OFF | ON | Don't Care | 3 |
| Left-to-right | ON | OFF | 1 | Don't Care |
| Transmit both sides | ON | ON | 2 | 1 |
| Receive both sides | OFF | OFF | Don't Care | Don't Care |
| Transmit right Receive left | ON | OFF | 2 | Don't Care |
| Transmit left Receive right | OFF | ON | Don't Care | 2 |
| Transmit/receive both sides | ON | ON | 2 | 2 |

FIG. 12.

LOCAL AREA NETWORK FOR DISTRIBUTING DATA COMMUNICATION, SENSING AND CONTROL SIGNALS

This is a division of parent co-pending application Ser. No. 11/190,884, filed Jul. 28, 2005, itself a continuation of grandparent application Ser. No. 09/349,020, filed Jul. 7, 1999, now U.S. Pat. No. 6,956,826, issued Oct. 18, 2005.

FIELD OF THE INVENTION

The present invention relates to the field of wired communication and control networks, and, more particularly, to local area networks and networks used for sensing, communication, and control.

BACKGROUND OF THE INVENTION

Local area networks (LANs) for distributing data communication, sensing, and control signals are often based on a "bus" topology, as shown in FIG. 1. Such a network 10 relies on shared electrically-conducting communication media 1, usually constituted by a twisted-pair of electrical conductors or a coaxial cable. Network data terminal equipment (DTE) units 5, 6, and 7 are connected via respective network adapters 2, 3, and 4 to communication media 1. Network adapters 2, 3, and 4 function as data communication equipment (DCE) units, and are tapped into communication media 1, forming parallel electric connections, and-thereby interface between DTE units 5, 6, and 7 and communication media 1. Such network adapters are also commonly referred to as "NIC", an example of which is the Network Interface Card IEEE 802 (Ethernet). Such a topology is commonly used for connecting personal computers (PCs) in a network. Network adapters can be stand-alone units, integrated into the DTE unit or housed therewith in a common enclosure.

Control networks, interconnecting sensors, actuators, and DTE's also commonly use the same topology, such as the network described in U.S. Pat. No. 4,918,690 (Markkula, Jr. et al.) and shown in FIG. 2. In a network 20, network adapters 22, 23, and 24 function as DCE's, but are commonly referred to as "nodes". The payloads 25, 26, and 27 are composed of sensors, actuators, and DTE's.

Hereinafter, the term "node" is used for both control and data-communication applications.

A topology (such as bus topology) whose physical layer communication media employs multi-point connections, is not optimal for communication, and exhibits the following drawbacks:
1. The maximum length of the communication media is limited.
2. The maximum number of units connected to the bus is limited.
3. Complex transceivers are required in order to interface the communication media.
4. The data rate is limited.
5. Terminators are required at the communication media ends, thus complicating the installation.
6. At any given time, only single connected unit may transmit; all others are receiving.
7. In case of short circuit in the bus, the whole network fails. Localizing the fault is very difficult.

Despite these drawbacks, however, bus topology offers two unique advantages:
1. If the application requires "broadcast" data distribution, where the data generated by a given node must be distributed to all (or a majority of) the nodes in the network, network operation is very efficient. This is because only a single network operation is required (i.e., to establish which node is the transmitter). The broadcast data is received by all other nodes in the network in parallel without additional network overhead.
2. The broadcast message is received simultaneously by all receiving nodes in the network. This is important in real-time control applications, for example, where orderly operation of the units must be maintained.

The communication-related drawbacks described above are solved by networks constructed of multiple communication links, wherein each instance of the link communication media connects only two units in the network. Here, the physical layer in each segment is independent of other links, and employs a point-to-point connection. Data and/or messages are handled and routed using data-link layer control. One example of such system for LAN purposes is the Token-Ring, described in the IEEE 802 standard. An example of a corresponding control network is described in U.S. Pat. No. 5,095,417 to Hagiwara et al. Both networks use circular topology ("ring topology") as illustrated in FIG. 3. A network 30 interconnects nodes (or NIC's) 32, 33, and 34 by three separate cables 31A, 31B, and 31C, each connecting a pair of nodes and forming three distinct physical layer communication links. Payloads (or DTE's) 35, 36, and 37 are respectively connected to the appropriate nodes.

Both the Hagiwara network and the Token-Ring network use unidirectional communication in each communication link and require a circular topology. The PSIC network described in U.S. Pat. No. 5,841,360 to the present inventor teaches a similar network where the use of a circular topology is optional, and bi-directional communication (either half-duplex or full-duplex mode) is employed in the communication links.

The above-mentioned prior art patents -and networks are representative only. Certain applications are covered by more than one issued patent. Additional discussion concerning the above-mentioned topologies can be found in U.S. Pat. No. 5,841,360 entitled. "Distributed serial control system" which issued Nov. 24, 1998 and co-pending U.S. patent application Ser. No. 09/123,486 filed Jul. 28, 1998, both in the name of the present inventor, and incorporated by reference for all purposes as if fully set forth herein.

Networks such as those illustrated in FIG. 3 typically use a "store and forward" mechanism, wherein the data received at a specific node is decoded at least to the data-link layer, and then re-encoded and transmitted to another point in the network as determined by the network control. This use of point-to-point communication links eliminates the communication drawbacks enumerated above in broadcast-based networks, but it lacks the two unique advantages of the broadcast technology, as also previously enumerated. Because the data is not inherently distributed throughout a network based solely on point-to-point communication links, such a network incurs a heavy overhead when broadcast is needed and exhibits delays in the propagation of messages. The overhead and delays result from the need to decode and re-encode messages at each node.

There is thus a widely-recognized need for, and it would be highly advantageous to have, a means of implementing a network which allows for both improved communication characteristics, while also supporting broadcast discipline and fast message distribution along the network.

SUMMARY OF THE INVENTION

It is an object of the present invention to provide a local area network in which at least some of the drawbacks described above are reduced or eliminated.

To this end, the present invention provides a local area network based on nodes connected to payloads. The nodes are interconnected to form a network of half-duplex or full-duplex communication links based on electrically conducting communication media such as twisted conductor pairs or coaxial cables. Each communication link interconnects two nodes in the network. Each node is capable of being dynamically configured as a transmitter or as a receiver. In addition, however, each receiving node can also be dynamically configured to be a repeater, which simply retransmits the received data. In this way, data from one link can be repeated to all other links via an automatic multicast process. In normal operation, a specific node is selected as the data generating unit to transmit data to the network. All other nodes serve as repeaters and receivers, and hence the data is multicast instantaneously from the selected data generating node throughout the network. After completing this transmitting session, another node may be selected as the data generating node, with all other nodes serving as repeaters and receivers in a like fashion.

A network according to the present invention can also be configured in a circular topology, enabling operation to continue even when there is a malfunction or loss of a communication link.

Therefore, according to the present invention there is provided a local area network for distributing data communication, sensing, and control signals, the local area network including at least three nodes having an operational mode and interconnected by at least two distinct communication links according to a topology, wherein: (a) each of the communication links has at least two electrical conductors; (b) each of the communication links connects two of the nodes in a point-to-point configuration; (c) each of the communication links is operative to communicating in a half-duplex mode; (d) at least one of the nodes is connected to a payload; (e) at least two of the nodes have the operational mode selectable as a data-generating operational mode; (f) at least one of the nodes has the operational mode selectable as a repeating operational mode; and wherein the local area network has a state selectable from a group of at least two distinct states, wherein each state is characterized by having a single selected one of the nodes in the data-generating operational mode, with the remainder of the nodes in operational modes selected from a group containing the receiving operational mode and the repeating operational mode.

BRIEF DESCRIPTION OF THE DRAWINGS

In order to understand the invention and to see how it may be carried out in practice, some preferred embodiments will now he described, by way of non-limiting example only, with reference to the accompanying drawings, in which:

FIG. 12 describes various possible node states, and the respective required switches states for a node as shown in FIG. 10.

DESCRIPTION OF THE PREFERRED EMBODIMENTS

Figure 1:
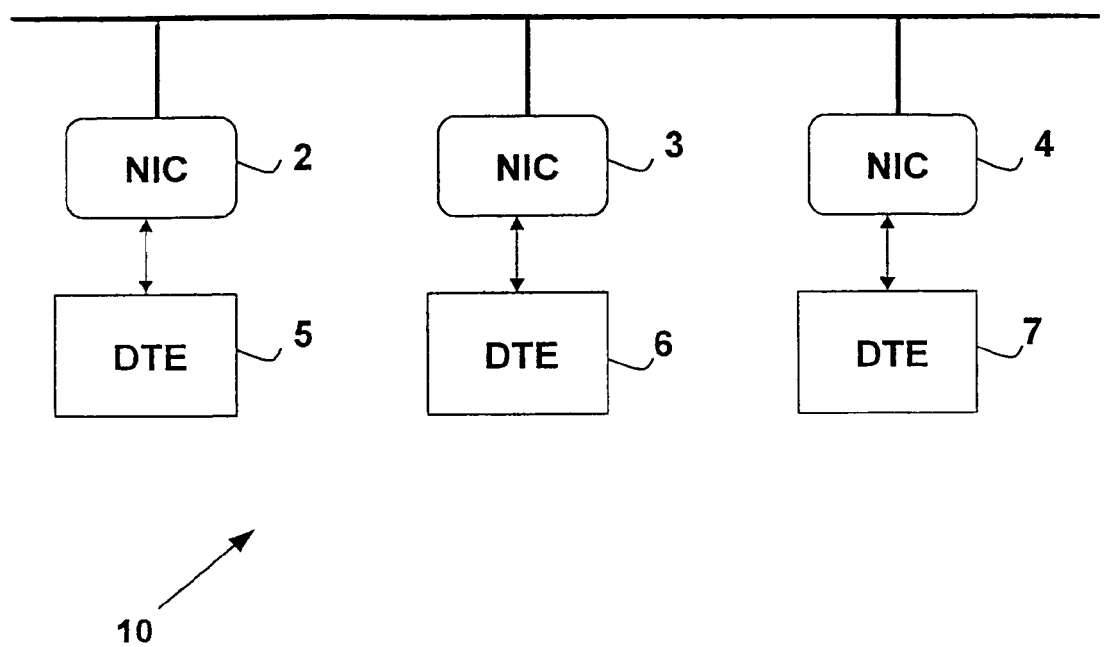
FIG. 1 shows a prior-art LAN for data communication, employing bus topology.
Figure 2:
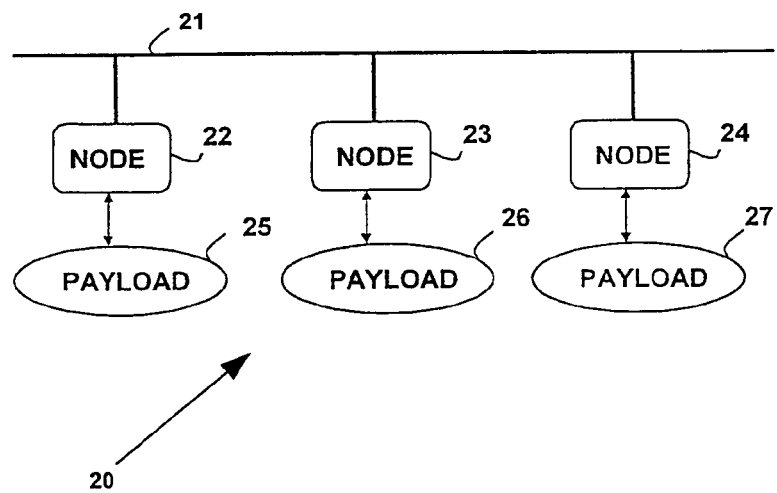
FIG. 2 shows a prior-art LAN for control, employing bus topology.
Figure 3:
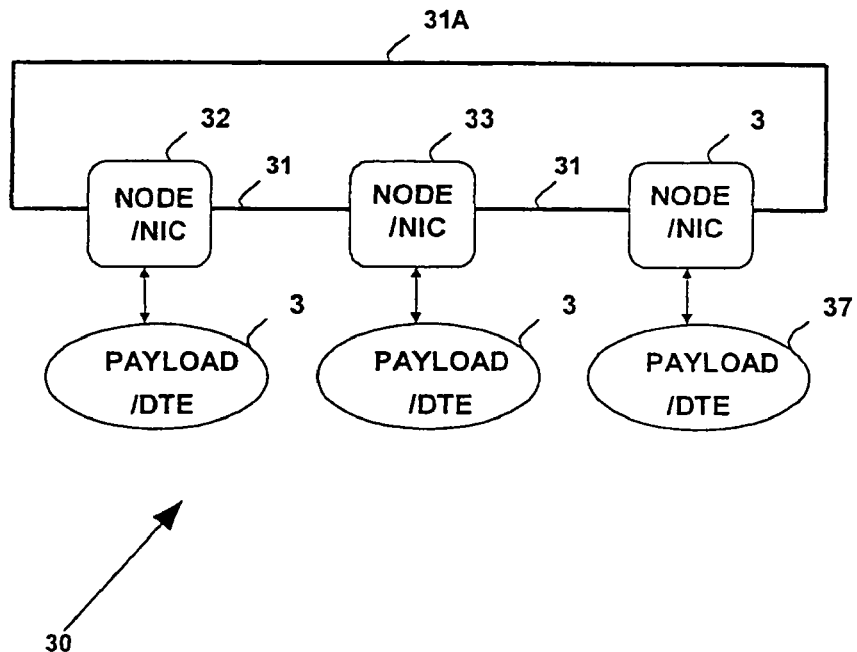
FIG. 3 shows a prior-art network for control or data-communication, employing circular topology.

The principles and operation of a network according to the present invention may be understood with reference to the drawings and the accompanying description. The drawings and descriptions herein are conceptual only. In actual practice, a single circuit can implement one or more functions; alternatively, each function can be implemented by a plurality of components and circuits. In the drawings and descriptions, identical reference numerals indicate those components that are common to different embodiments or configurations.

Figure 4:
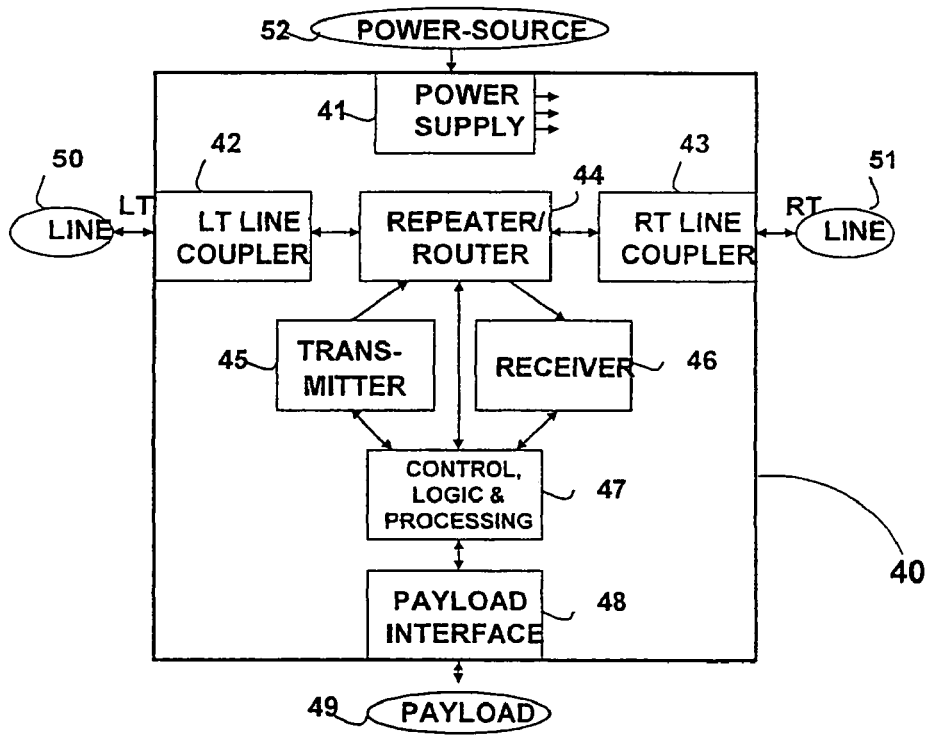
FIG. 4 describes a general block diagram of a node according to the present invention.

FIG. 4 schematically shows a node 40 according to the present invention. Node 40 contains the following functional blocks:

A power supply 41, fed from a power source 52, which converts incoming power to the voltage, or voltages, required by the node and the node's components. In addition, power supply 41 may also feed a payload 49 connected to node 40. If used, this feeding function is carried out by a payload interface 48. (For clarity, FIG. 4 omits the individual connections distributing power from power supply 41 to the power-consuming blocks of node 40.)

A payload interface 48 which adapts node 40 to a specific payload 49. Various payload types can be employed, such as sensors, actuators and data units, either analog or digital, functioning either as output or as input. For example:

Analog sensor. The payload consists of analog sensor used to measure any physical phenomena. In most cases, the payload interface contains an A/D converter.

Digital sensor. The payload is a switch, button etc.

Analog actuator. In most cases the payload contains a D/A converter controlling the parameters of the analog actuator.

Data related unit. In the case of digital communication, the payload consists of DTE and the payload interface contains a DTE interface.

Non-digital data. Data such :as video, voice, analog communication or any other of data type. If analog data is input to the node, the payload interface is likely to use an A/D converter. The above examples are not intended to limit in any way the general payload definition. Furthermore, multiple devices of various types can be used. In some cases, payload 49 may use power from node 40. For example, the excitation voltage to analog sensor may be driven from the node power. Some nodes in the network may not be connected to a payload, or may not have any payload interface at all. Nodes configured in this manner would be used as repeaters only, such as a node 90 in FIG. 8 Repeater nodes can be used, for example, to extend the distance between nodes beyond the regular limit.

Line couplers 42 and 43, which interconnect node 40 with up to two other nodes, each via communication media 50 and 51, respectively (also referred to as "lines"). Each communication media supports communication between two nodes of the network. For clarity only, the two ports are designated 'Left'-LT and 'Right'-RT. The right connection RT uses line 51 and connects via RT line coupler 43. Similarly, the left connection LT uses line 50 and connects via LT line coupler 42. Neither line coupler 42 nor line coupler 43 affects the communication signal. Line couplers may include connectors, protection devices, isolation (e.g. transformer) and other required functions, which are not normally associated with the communication signal itself.

A transmitter 45, which deals with the data to be transmitted, except for the physical layer functions (according to the OSI interconnection model). This block can be implemented in hardware (CRC generation circuitry, for example) by software, or by both hardware and software.

A receiver 46, which deals with the received data except for the physical layer functions (according to the OSI interconnection model). This block can be implemented in hardware (CRC error detection circuitry, for example), by software, or by both hardware and software.

A control, logic, and processing unit 47, which controls and monitors node 40 and network operation. This block interconnects with the controlled blocks in node 40 (for clarity, some lines are omitted from FIG. 4) In addition, control, logic, and processing unit 47 can process data in the network, and also deals with the payload via payload interface 48. Control, logic, and processing unit 47 is furthermore in charge of shifting a repeater/router 44 from one state to another, as detailed below.

Repeater/router 44 deals with the physical layer characteristics of the communication signal. The repeater/router can be in various states, including a receive-only state and a transmit-only state. The signal is encoded and decoded, and is routed according to the control signals from control, logic, and processing unit 47. Detailed explanation of the repeater/router 44 follows.

A node can be stand-alone or integrated into the payload. For example, in the case of personal computer, the node can be housed within the computer enclosure as an add-on card.

Figure 5A:
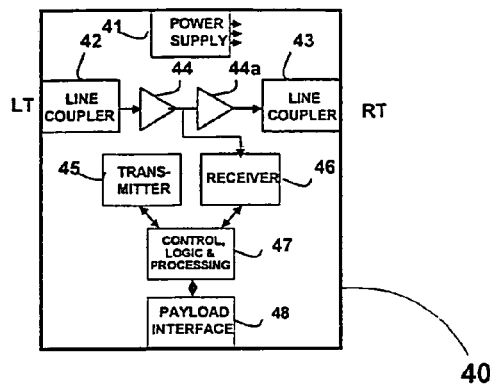
FIGS. 5a, 5b, 5c, and 5d show different possible states of a node according to the present invention.
Figure 5B:
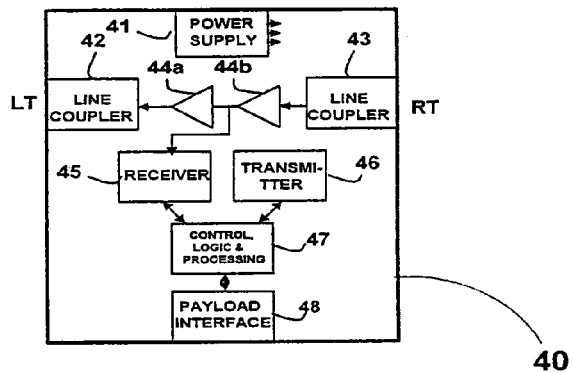

FIGS. 5a and 5b describe the various repeater/router functions by means of the possible states of a repeater/router during normal operation. As shown in FIG. 5a, repeater/router 44 contains two units connected in series. A line receiver 44b decodes the communication signal in the line into a digital signal which is fed to receiver 46 for analyzing the data-link and higher OSI layers. The digital signal is then fed to a line driver 44a which encodes the communication signal again. The pair consisting of line receiver 44b and line driver 44a thus form a communication signal repeater which performs a transparent routing of the communication signal from 'left' to 'right'. The delay between input and output is negligible, in the order of nano-seconds or micro-seconds.

Similarly, FIG. 5b allows for a routing from 'right' to 'left'. The direction of repeater/router 44 is controlled by control, logic, and processing unit 47, via control lines (omitted for clarity from FIG. 5).

Figure 5C:
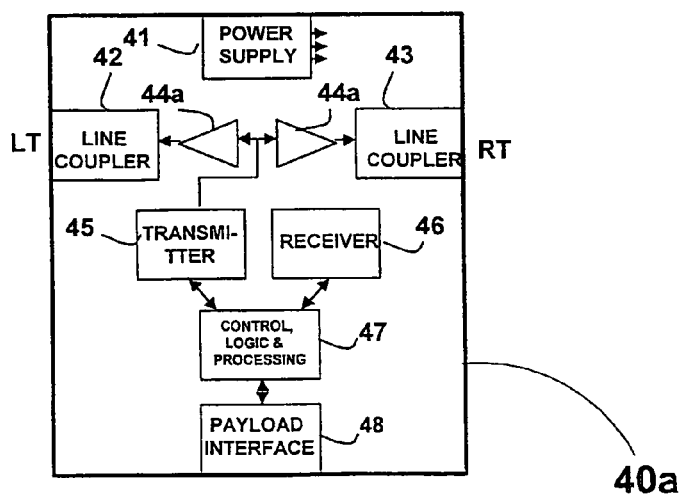
Figure 5D:
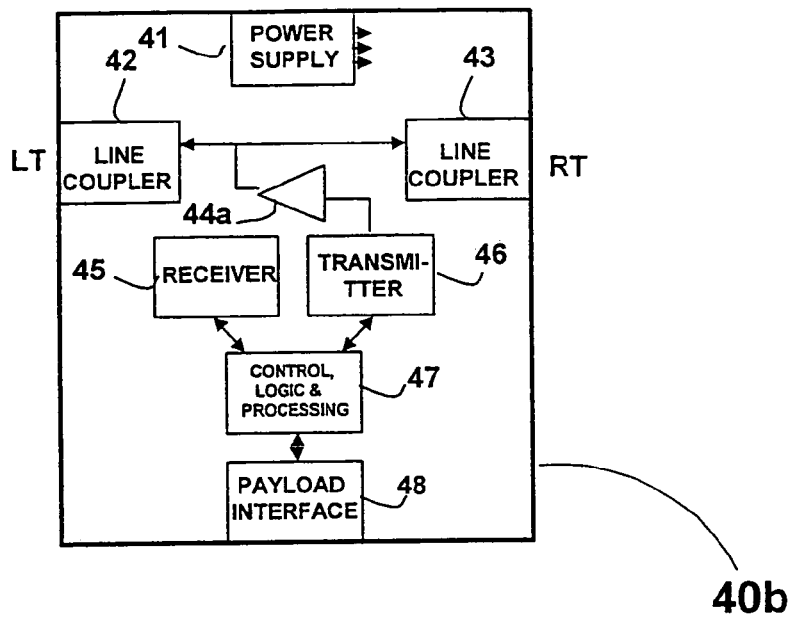

Whereas FIGS. 5a and 5b describe a node which does not generate any data (but only receives and transfers the data in the network), FIGS. 5c and 5d illustrate nodes in the transmitting state. In both cases, the node transmits data to both the right and left connections via the respective line coupler. In FIG. 5c, two line drivers 44a are used, one for each direction. In FIG. 5d, a single line driver 44a is used, driving both directions from a single unit. Both embodiments can be used interchangeably. In most cases, the line driver and line coupler characteristics will be the basis for selecting one configuration in preference over the other. For example, if the line driver is capable of driving a single line only, the configuration of FIG. 5c should be used.

Figure 6:
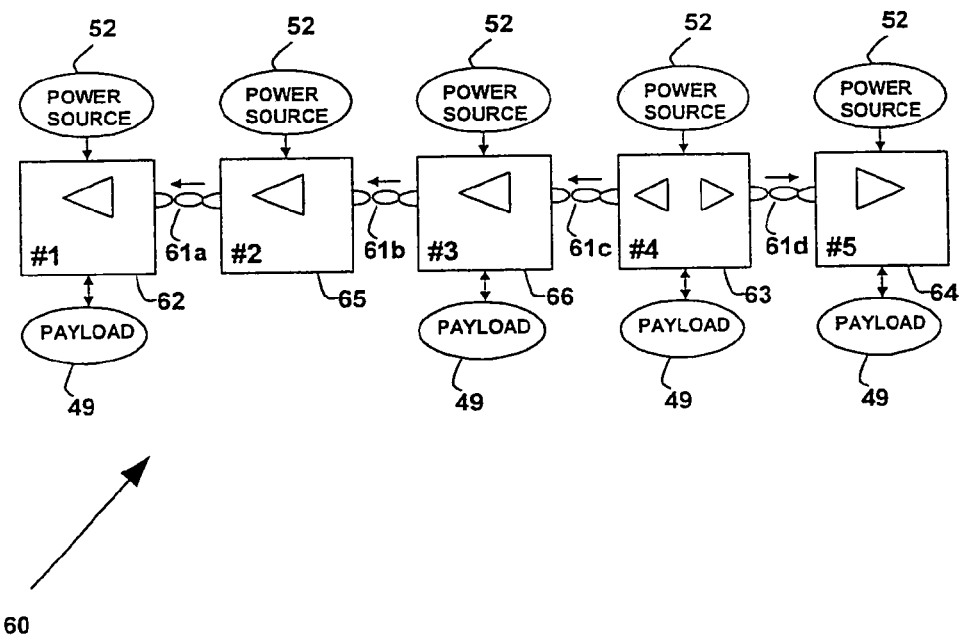
FIG. 6 shows a state of a network according to the present invention.

FIG. 6 shows a network 60 according to the present invention. Electrically-conducting communication media of lines 61a, 61b, 61c, and 61d are used to interconnect the nodes. At least two conductors are used in the communication media. For example, coaxial cables or copper twisted-pairs may be used. For clarity only, the figures herein illustrate the use of a single twisted-pair in non-limiting examples.

Nodes 62, 63, 64, 65 and 66 are all the based on node 40 as described previously. Nodes 62, 65, and 66 are in 'Right' to 'Left' state as illustrated in FIG. 5b, whereas node 64 is in 'Left' to 'Right' state as illustrated in FIG. 5a. Node 63 is the data generating node as in FIG. 5c and 5d. The network in FIG. 6 shows one possible state of the network, wherein node 63 is the data-generating node, while all other nodes serve as receivers and repeaters, receiving the data and re-transmitting the data to the next sequential node. In order to support dynamic reconfiguration, nodes can simultaneously have more than one operational mode. In a non-limiting fashion a node can have:

a data-generating operational mode, wherein a node functions as a source of data, and transmits this data to other nodes;

a receiving operational mode, wherein the node receives data from another node; and a repeating operational mode, wherein the node functions as a repeater of data received from one given node by re-transmitting this data to another given node.

While the network is functioning, the current operational mode of a node is selectable from the available operational modes. Some operational modes may be mutually exclusive, while others may be selected simultaneously. For example, the data-generating operational mode is exclusive of the repeating operational mode, whereas the receiving operational mode may be selected at the same time as the repeating operational mode.

In most applications, more than one node can serve as a data-generating node at different times. In such a case, the network states will be changed as a function of time according to predetermined logic and control, in order to allow each data generating node an opportunity to transmit. However, no more than a single node can serve as data-generating node at a time. While a node is serving as data-generating node, all other nodes states are accordingly set to be repeaters and/or receivers, to allow for data distribution along the network. Nodes located 'left' of the data generating node will be in a 'right to left' state, while nodes located 'right' of the data-generating node will be in a 'left to right' state.

It should be clear that, whereas the nodes at the network ends, the 'left-most' node 62 and the 'right-most' node 64 could use the same structure as shown in FIG. 4 (and can be implemented in the same way as all other nodes in the network), the end nodes utilize only single line connection. Thus these end nodes can be implemented using a single line coupler and single line driver.

It should also be clear that one or more of the nodes in the network need not be connected to a payload, as is illustrated for node 65 in FIG. 6 This may be the case where the attenuation in the line is too high (e.g. a line is too long), and a node serves mainly as a repeater. In such a case, payload interface 48 would not be required.

Network Powering.

Figure 8:
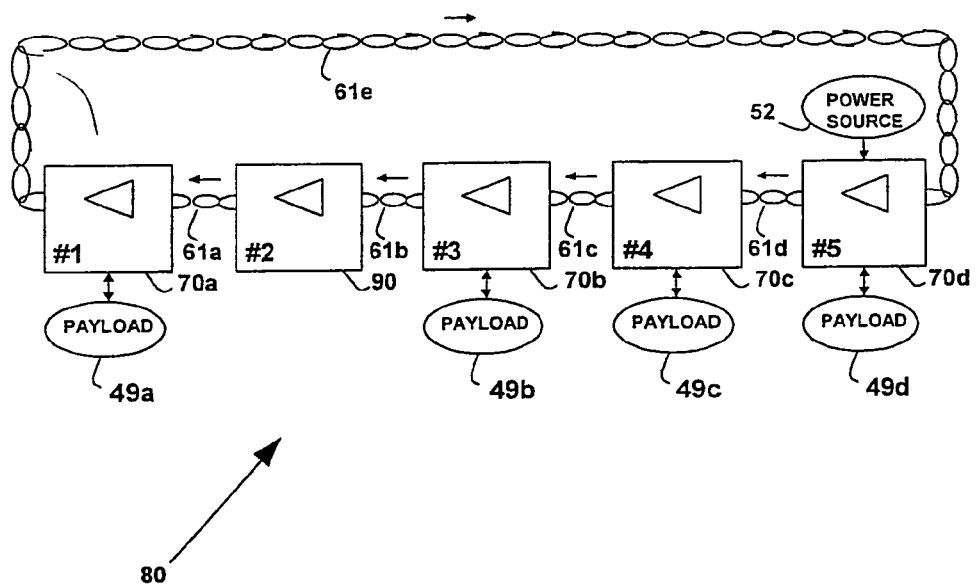
FIG. 8 shows a state of a network according to the present invention, wherein power is carried by the network and employing circular topology.

FIG. 6 illustrates a network wherein each node is locally powered by a local power source 52, which supplies electrical power for operating the components of the network. Alternatively, the network communication media can be used for power distribution. In one embodiment of the present invention, the power is distributed via dedicated lines, such as by the use of two additional wires within the same cable. In a preferred embodiment, the same wires can be used for both data communication and power distribution. The latter configuration is described in co-pending U.S. patent application Ser. No. 09/141,321, filed by the present inventor on Aug. 27, 1998, which is applicable to the network discussed herein and incorporated by reference. FIG. 8 illustrates such a network, allowing for single power-supply to be used for powering the whole network.

Figure 7:
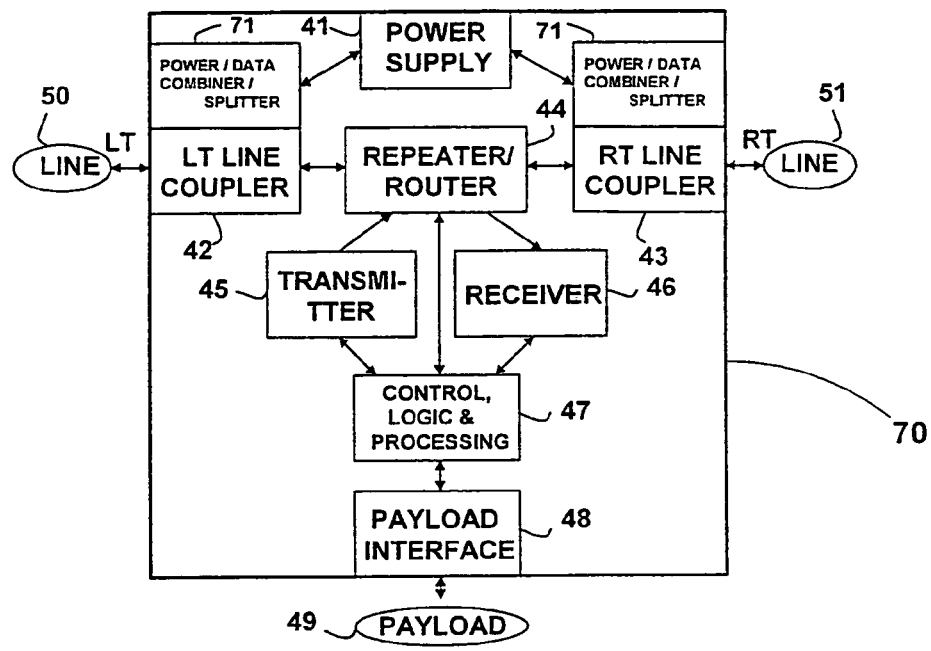
FIG. 7 shows a general block diagram of a node according to the invention, wherein power is also carried by the network.

When the same wires are used for both communication and power, the node 40 should be modified to include a power/data combiner/splitter 71 as shown in FIG. 7 A node 70 is shown with two power/data combiner/splitters 71 coupled to line couplers 42 and 43. A node such as node 70 can receive power from either the left or the right sides or from both sides, and carry the power to the non-powered side. Being powered from the network, no power source interface will be usually supported for such a configuration. The power source feeding the network can connect thereto via dedicated couplers or via one or more of the nodes, modified to support such capability.

Circular Topology.

Figure 9A:
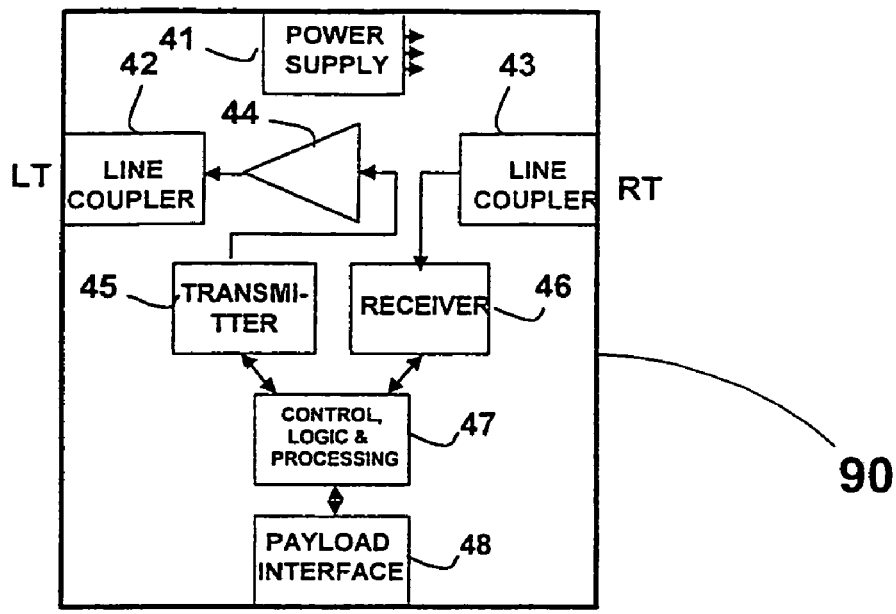
FIGS. 9a and 9b show different possible states of a node in circular topology network according to the present invention.
Figure 9B:
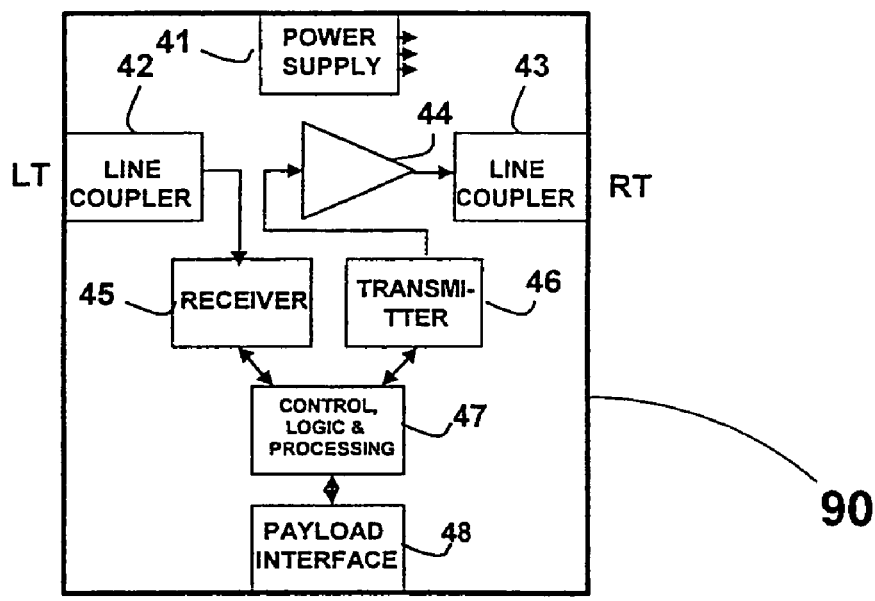

While the foregoing description applies the present invention to a linear topology, the present invention can also be implemented using a circular topology for 'ring' type networks. In one embodiment, both ends of the network are connected to a node which is configured to receive from both sides, hence including two receivers. However, FIG. 8 shows a preferred embodiment of a network 80. In network 80, all nodes except the data-generating node are configured to the transparent repeater state, either uniformly 'right-to-left' or uniformly 'left-to-right'. A node 90 in the data-generating state is modified as illustrated in FIGS. 9a and 9b. Node 90 can transmit to one side and receive from the other. In FIG. 9a node 90 can transmit to the left side and receive from the right side. Similarly, in FIG. 9b node 90 can transmit to the right side and receive from the left side. Either state can be used in circular topology. In FIG. 8, node 90 is in the state shown in FIG. 9a. Alternatively, node 90 can be in the state shown in FIG. 9b. All other nodes of FIG. 8 are configured in the 'right-to-left' direction. In both cases, the data-generating node 90 transmits to one side and receives from the other. The receiving functionality of node 90 can be used for monitoring the network, to insure that the data path is available and is error-free. However, this receiver functionality is an option only, and does not have to be implemented.

For compactness, FIG. 8 demonstrates both the power feeding via the network and the circular topology together, but these features are independent and may be implemented separately.

Network Control.

As described above, the operation of the network (either bus or circular topology) switches from state to state. Each state is characterized by having a specific node functioning as data-generating node at a time, while all other nodes serve as repeaters and receivers, routing the data coming from the data-generating node. Hence, there is a need for a network controller to determine which node in the network will be the data-generating node.

Various techniques can be used to implement such a network controller. The network controller can select nodes sequentially, by means of token passing from node to node (similar to that of the Token-Ring network). The network controller can be external to the network, using dedicated communication media. Preferably, the network controller will be embedded and will manage the network states via signals transported by the network itself. In most cases, each node should be allocated an address, enabling data routing in the network from arbitrary node to arbitrary node.

Another popular method of network discipline is 'master/slave' operation. In another embodiment of the present invention, one of the nodes will be designated as the master node. In the initial state, this node serves as the data-generating node, and while in this state directs other nodes to transmit. During the following state the selected node will serve as the data-generating node. This two-state sequence will be repeated, with a different node selected to be the data-generating node in each subsequent cycle, according to predetermined logic or under external control.

Dual Discipline Network.

The network taught by U.S. Pat. No. 5,841,360 to the present inventor, herein referred to as the "PSIC Network", employs multiple communication links, independent of each other. Such a network supports several features which are not available in the previously-described network, such as automatic addressing, fault localization, and circular topology redundancy in the case of single failure.

In order to exploit the benefits of both these network types it is possible to construct a network which supports both disciplines. and can be controlled to be either in one discipline or in the other. For example, the network may start as PSIC Network. During this start-up period, automatic addressing and fault localization will be performed. Thereafter, the network may configure itself to work according to this application or may use time-sharing and alternately switch between both configurations.

Figure 10:
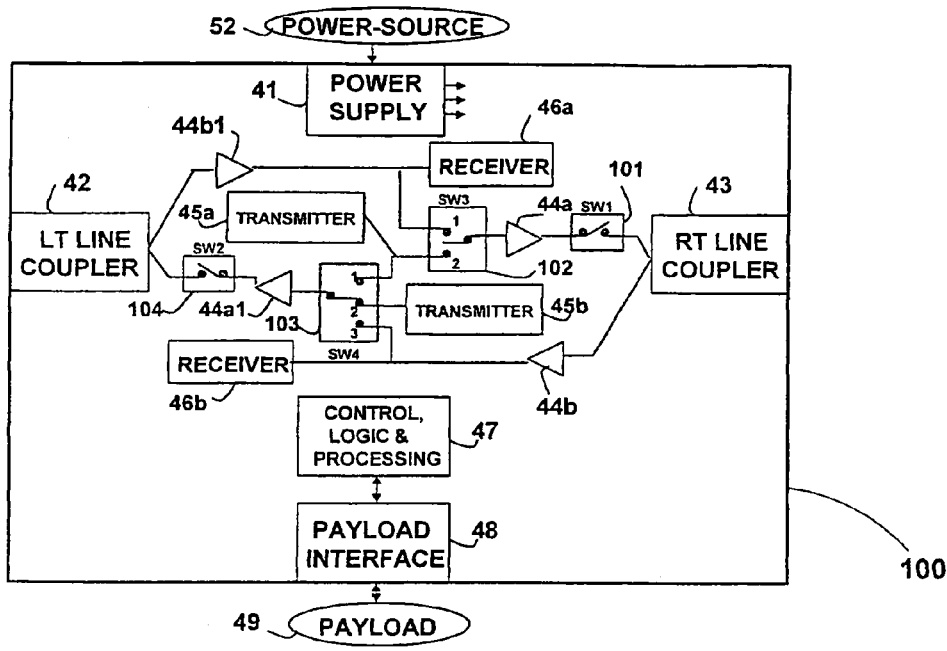
FIG. 10 shows a block diagram of a node according to a preferred embodiment.

FIG. 10 shows a schematic view of a node 100 which is capable of both roles. The state of node 100 is determined by switches 101, 104, 102, and 103, designated SW1, SW2, SW3 and SW4 respectively. These switches are controlled by control, logic, and processing unit 47. Node 100 employs transmitters 45a and 45b, as well as receivers 46a and 46b. Line driver 44a serves the right port; while line driver 44a1 serves the left connection. Similarly, line receivers 44b and 44b1 are connected to the right and left interfaces respectively.

FIG. 12 lists the various possible node states for node 100 (FIG. 10). The states in FIG. 12 are given in a Node State column, and the switch settings are given in SW1, SW2, SW3, and SW4 columns. In a 'Right-to-left' state, data received in the right port is handled by line receiver 44b and fed to line receiver 46b. Simultaneously, the received data is fed to line driver 44a1, which transmits to the left side. Thus, the functionality shown in FIG. 5b is obtained. In a similar way, the 'Left-to-right' state is implemented to achieve a functionality as shown in FIG. 5a. In the latter case, line receiver 46a is the active one.

In the 'transmit both sides' state, transmitter 45a transmits to both ports using line drivers 44a and 44a1, implementing the functionality shown in FIG. 5c. In the 'receive both sides' state, each receiver is connected to single line coupler, and no line driver is activated. This is expected to be the state when the network is idle or as an interim state while switching between states, in order to avoid data collisions caused by two or more transmitters active over the same link.

The 'transmit right receive left' state reflects the state shown in FIG. 9b. Similarly, the 'transmit left receive right' state reflects the functionality shown in FIG. 9a.

In the 'transmit/receive both sides' state, the node can receive and transmit in both interfaces simultaneously, thus implementing the full PSIC Network functionality.

Nodes with More than Two Line Connections

Figure 11:
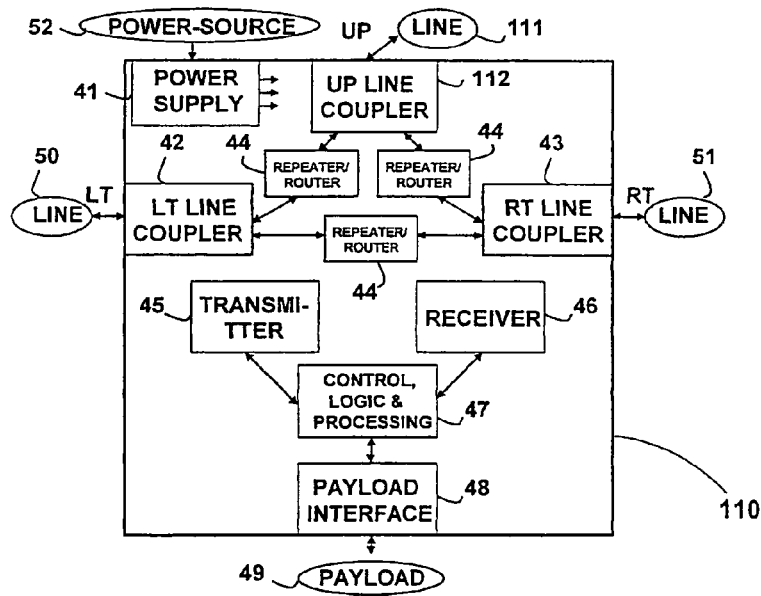
FIG. 11 shows a block diagram of a node according to the present invention, supporting three line couplers.

Whereas the foregoing discussion describes a node having two line couplers (which may be reduced to single interface in the case of an end-unit in a network employing 'bus' topology), it is obvious that three or more such interfaces could also be used. In such a case, at least one additional repeater/router must be added for each additional interface. For example, FIG. 11 illustrates a node 110 having three interfaces, where an additional interface is designated as 'up', and uses a line coupler 112 for interfacing to a line 111. In order to support the interconnection between all three ports, three repeater/router units 44 are used, each constructed as described previously and suitable for connecting two ports. In some applications, where the connectivity requirements can be reduced, any two out of the three ports may be used.

Similarly, additional interfaces can be used. Furthermore, a network can employ nodes of different interface capacities, which can be freely connected to construct a network of arbitrary topology. In all cases, the basic rule that each communication link connect only two nodes must be observed. Furthermore, the network logic embedded in the nodes has to insure that no more than a single node generates data, while all others must be in the transparent repeater/router state, directed from the data-generating node.

Implementation.

Implementing any of the above schemes is straightforward for anyone skilled in the art. In one embodiment, RS-485 (EIA-485) is employed for the physical layer. In such a case, line driver 44a and line receiver 44b are directly implemented using a common RS-485 line driver or line receiver, respectively. Similarly, the switches illustrated in FIG. 10 can be implemented using manually-activated switches, relays, analog switches. or digital switches/multi-plexers. Except in the case of manual switches, switching is controlled electronically.

Repeaters and regenerators are known in both prior-art WAN (Wide Area Network) and LAN (Local area network) systems, mainly for the purpose of allowing operation over lengthy connections. However, there are major differences between those networks and the present invention. First, most prior-art repeaters employ single input and single output. The present invention allows for multiple ports. Second, prior-art repeaters are unidirectional, while the present invention is not restricted to a specific direction of data flow. Additionally, the present invention requires a control mechanism (a network controller) for determining the data flow direction, whereas prior-art systems, being unidirectional, do not require such control. In most prior-art networks, units in the network can be clearly defined as either payload-associated units or dedicated repeaters. Such a distinction is not valid when implementing a network according to the present invention, since each payload-associated unit in the network also includes the repeater functionality.

Although a network according to the present invention, when configured in circular topology, can be superficially similar to a Token-Ring network, there are major differences between them. In a Token-Ring network, there is a single constant direction of data flow. The present invention does not impose single direction of data flow, but the flow may change as part of the network operation. In addition, in Token-Ring networks the data-generating unit is sequentially allocated according to the network topology. In the present invention, the data-generating node need not be chosen according to any specific rule, although sequential selection of the data-generating node is possible.

While the invention has been described with respect to a limited number of embodiments, it will be appreciated that many variations, modifications and other applications of the invention may be made.

What is claimed is:

1. A control network in a building for wired coupling of at least one analog device to a data unit, the network comprising:
   a plurality of nodes including first, second and third nodes; and
   a plurality of wiring segments including first and second wiring segments, each wiring segment comprising at least two conductors, wherein
   said first wiring segment connects said first and second nodes together in a point-to-point connection, and said second wiring segment connects said second and third nodes together in a point-to-point connection, wherein:
   said first and second nodes effect bi-directional communication of serial digital data over said first wiring segment and said second and third nodes effect bi-directional communication of serial digital data over said second wiring segment,
   at least one of said nodes is connectable to a data unit for coupling the serial digital data carried over at least one of said wiring segments to the data unit,
   at least one of said nodes comprises an analog/digital or digital/analog converter connectable to the analog device for coupling the serial digital data carried over said at least one of said wiring segments to the analog device,
   the analog device is a sensor or an actuator,
   each of said nodes is addressable in said network, and
   each of said nodes is connected by a respective pair of said wiring segments to only two other nodes, said nodes are connected by the wiring segments in a ring configuration, each of said nodes is in direct signal conducting communication only with a unique pair of other nodes and one of the data unit and the analog device, and each of said nodes is operative to be in a selected state to conduct data in both directions around the ring.

2. The network according to claim 1, wherein at least one of said wiring segments comprises a twisted wire pair or a coaxial cable.

3. The network according to claim 1, wherein the serial digital data is packet-based.

4. The network according to claim 1, wherein at least one of said wiring segments concurrently carries a direct current (DC) power signal, and at least one of said nodes is at least in part powered by the power signal.

5. The network according to claim 1, wherein at least one of said nodes is connectable to a direct current (DC) power source supplying a DC power signal, and at least one of said wiring segments concurrently carries the power signal.

6. The network according to claim 1, wherein said nodes are operative to reroute serial digital data in the event of failure of one of said wiring segments.

7. The network according to claim 1, wherein each of said nodes has a manually assigned address.

8. The network according to claim 1, wherein each of said nodes has an automatically assigned address.

9. The network according to claim 1, wherein each of said nodes has an address assigned by a data unit connected to said node.

10. The network according to claim 1, wherein at least one of said nodes is operative to power a device connected thereto.

11. The network according to claim 1, wherein at least one of said nodes is operative to power the analog device.

12. The network according to claim 1, wherein the at least one analog device includes a first analog device in the form of a sensor to which a first one of said nodes is connectable and a second analog device in the form of an actuator to a which a second one of said nodes is connectable, and wherein operation of the actuator is dependent upon the sensor output.

13. The network according to claim 1, wherein the at least one analog device is an analog sensor, to which one of said nodes is connectable, for measuring a physical phenomenon, and said one of said nodes further comprises an analog to digital converter for converting analog signals from the analog sensor into serial digital data.

14. The network according to claim 1, wherein the at least one analog device is an analog actuator, to which one of said nodes is connectable, for producing a physical phenomenon, and said one of said nodes further comprises a digital to analog converter for converting serial digital data into analog signals for the analog actuator.

15. The network according to claim 1, wherein at least one of said nodes is operative to repeat at least part of the serial digital data received from one wiring segment connected to said at least one node to the other wiring segment connected to said at least one node.

16. The network according to claim 1, wherein all the communication links are operative to communicate in half duplex mode.

17. The network according to claim 1, wherein all the communication links are operative to communicate in full duplex mode.

18. The network according to claim 1, wherein at least one of the wiring segments is operative to carry a video or voice signal.

19. A local area network comprising:
a plurality of nodes including a first node including a first data port for coupling to a first component, a second node including a second data port for coupling to a second component and a third node including a third data port for coupling to a third component;
a plurality of wiring segments each having two ends and consisting of only two conductors, said plurality of wiring segments including a first wiring segment connecting only said first and second nodes in a point-to-point connection for a first half-duplex data communication of serial digital data over said first wiring segment between said first and second nodes, and a second wiring segment connecting only said first and third nodes in a point-to-point connection for a second half-duplex data communication of serial digital data over said second wiring segment between said first and third nodes,
wherein:
each of said nodes is connected by a respective pair of said wiring segments to only two other nodes, said nodes are connected by the wiring segments in a ring configuration, and each of said nodes is in direct signal conducting communication with a unique pair of other nodes and one component; and
said network is operative to be in at least a selected one of first and second states;
in the first state, said network is operative to conduct data from said second data port over said first wiring segment from said second node to said first node, repeat the data at said first node to said second wiring segment, and conduct the repeated data over said second wiring segment from said first node to said third node; and
in the second state, said network is operative to conduct data from said third data port over said second wiring segment from said third node to said first node, repeat the data at said first node to said first wiring segment, and conduct the repeated data over said first wiring segment from said first node to said second node.

20. The network according to claim 19, wherein at least one of said nodes further comprises a control, logic and processing unit connected in said at least one node for controlling said at least one node to establish a selected one of said first and second states.

21. The network according to claim 20, wherein each of said nodes is housed in a single enclosure.

22. The network according to claim 19, wherein said network periodically sequentially shifts between the first and second states.

23. The network according to claim 19 wherein each of said nodes is addressable in said network.

24. The network according to claim 19, wherein said network is further operative to reroute digital data in the event of failure of one of said wiring segments.

25. The network according to claim 19 further comprising a third wiring segment having two ends and consisting of only two conductors, said third wiring segment being connected to said first node, and wherein in the first state, said first node is operative to repeat data from said first wiring segment to the third wiring segment, and in said second state said first node is operative to repeat data from said second wiring segment to said third wiring segment.

26. The network according to claim 19, wherein at least one of said wiring segments concurrently carries a power signal over said two conductors substantially without interfering with data communication over said at least one wiring segment, and at least part of at least one of said nodes is powered from the power signal.

27. The network according to claim 19, wherein at least one of said wiring segments concurrently carries a power signal over the two conductors substantially without interfering with the data communication, and at least one component is powered from the power signal carried over a wiring segment connected to the respective node.

28. The network according to claim 19, wherein said two conductors of at least one of said wiring segments concurrently carry a power signal over substantially without interfering with the data communication, and at least one of said nodes is connectable to a power source for coupling the power signal to the power source.

29. The network according to claim 19, wherein at least one out of said first and second wiring segments is one of a twisted wire pair or a coaxial cable.

30. The network according to claim 19, wherein said network is further operative for analog sensing and control, wherein said network further comprises an analog port and a converter for converting between analog and digital signals coupled between said analog port and said port of one of said nodes, and said analog port is couplable to an analog sensor or to an analog actuator constituting one of the components.

31. The network according to claim 30, wherein said network is further operative to carry video or voice signals.

32. The network according to claim 19 wherein at least one of said nodes is enclosed in a single enclosure together within a respective connected component.

33. The network according to claim 19, wherein said network is further operative to be in a third state in which data received from the first component via said first data port is repeated to both said first and second wiring segments.

34. A local area network for carrying power and digital data, said network comprising:
- a plurality of nodes including a first node including a first data port for coupling to a first data unit, a second node including a second data port for coupling to a second data unit and a third node including a third data port for coupling to a third data unit;
- a plurality of wiring segments each having two ends and comprising a first coaxial cable or at least one first twisted wire pair, wherein each end of each of said wiring segments is terminated in a connector, said plurality of wiring segments including first and second wiring segments, said first wiring segment connecting only said first and second nodes in a point-to-point connection for a first full-duplex data communication of serial digital data over said first wiring segment between the first and second data units, and said first wiring segment being connected to concurrently carry a first power signal substantially without interfering with the first communication of serial digital data and said second wiring segment connecting only said first and third nodes in a point-to-point connection for a second full-duplex communication of serial digital data over said second wiring segment between the first and third data units, and said second wiring segment being connected to concurrently carry a second power signal substantially without interfering with the second communication of serial digital data, wherein:
- each of said nodes is connected by a respective pair of said wiring segments to only two other nodes, said nodes are connected by the wiring segments in a ring configuration, and each of said nodes is in direct signal conducting communication with a unique pair of other nodes,
- said first node is connectable to a power supply to be powered from the power supply, and the first and second power signals are provided by the power supply,
- said second node is at least in part powered by the first power signal,
- said third node is at least in part powered by the second power signal, and
- each of said nodes is addressable in said network.

35. The network according to claim 34,
wherein:
- said network is further operative to be in a selected one of at least first and second states;
- in the first state, data received from said second data port is carried over said first wiring segment from said second node to said first node, repeated by the first node to said second wiring segment, and carried over said second wiring segment from said first node to said third node; and
- in the second state, data received from said third data port is carried over said second wiring segment from said third node to said first node, repeated by said first node to said first wiring segment, and carried over said first wiring segment from said first node to said second node.

36. The network according to claim 34, wherein said network is further operative to reroute digital data in the event of failure of one of said wiring segments.

37. The network according to claim 34, wherein said network is further operative for analog sensing and control, wherein said network further comprises an analog port and a converter for converting between analog and digital signals coupled between said analog port and said data port of one of the nodes, and said analog port is couplable to an analog sensor or to an analog actuator.

38. The network according to claim 37, wherein said network is further operative to carry video or voice signals.

39. The network according to claim 34, further comprising a single enclosure housing at least one of said nodes together with a respective connected data unit.

40. The network according to claim 34, wherein said network is further operative to be in a third state in which data received from the first data unit via said first data port is repeated to both said first and second wiring segments.

41. The network according to claim 34 wherein at least one of the connected data units is at least in part powered by a power signal carried over one of said wiring segments.

42. The network according to claim 34, wherein at least one of said wiring segments comprises dedicated power conductors carrying only a respective power signal and data conductors carrying distinct from the power conductors and carrying respective serial digital data.

43. The network according to claim 34, wherein at least one of said wiring segments carries a respective power signal and data over the same conductors.

44. The network according to claim 34 wherein at least one of said nodes is housed together with a connected data unit.

* * * * *

UNITED STATES PATENT AND TRADEMARK OFFICE
CERTIFICATE OF CORRECTION

| | | |
|---|---|---|
| PATENT NO. | : 8,121,132 B2 | |
| APPLICATION NO. | : 11/438259 | |
| DATED | : February 21, 2012 | |
| INVENTOR(S) | : Binder | |

It is certified that error appears in the above-identified patent and that said Letters Patent is hereby corrected as shown below:

Column 3, line 52, delete "he" and insert therefor -- be --.

Signed and Sealed this
Fifteenth Day of May, 2012

David J. Kappos
*Director of the United States Patent and Trademark Office*